(12) United States Patent
Mital et al.

(10) Patent No.: US 7,512,829 B2
(45) Date of Patent: Mar. 31, 2009

(54) REAL TIME EVENT STREAM PROCESSOR TO ENSURE UP-TO-DATE AND ACCURATE RESULT

(75) Inventors: Vijay Mital, Sammamish, WA (US); Gueorgui B. Chkodrov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 11/148,512

(22) Filed: Jun. 9, 2005

(65) Prior Publication Data

US 2006/0282695 A1  Dec. 14, 2006

(51) Int. Cl.
G06F 17/00 (2006.01)
(52) U.S. Cl. .......................... 713/502; 707/3
(58) Field of Classification Search ............ 713/502; 707/3
See application file for complete search history.

(56) References Cited

U.S. PATENT DOCUMENTS

| | | | |
|---|---|---|---|
| 5,267,873 A | 12/1993 | Provenzale | |
| 5,276,873 A * | 1/1994 | Peters | 707/4 |
| 6,617,969 B2 | 9/2003 | Tu et al. | |
| 6,895,438 B1 | 5/2005 | Ulrich | |
| 2002/0128925 A1 | 9/2002 | Angeles | |
| 2003/0018643 A1* | 1/2003 | Mi et al. | 707/10 |
| 2003/0033180 A1 | 2/2003 | Shekar et al. | |
| 2003/0084127 A1 | 5/2003 | Budhiraja et al. | |
| 2003/0208392 A1 | 11/2003 | Shekar et al. | |
| 2003/0229652 A1 | 12/2003 | Bakalash et al. | |
| 2004/0078464 A1 | 4/2004 | Rajan et al. | |
| 2004/0093381 A1 | 5/2004 | Hodges et al. | |
| 2004/0098358 A1 | 5/2004 | Roediger | |
| 2004/0172409 A1 | 9/2004 | James | |
| 2004/0220910 A1 | 11/2004 | Zang et al. | |
| 2005/0071347 A1 | 3/2005 | Chau et al. | |
| 2005/0154628 A1 | 7/2005 | Eckart et al. | |
| 2005/0216482 A1 | 9/2005 | Ponessa | |
| 2006/0053120 A1 | 3/2006 | Shum et al. | |
| 2006/0122872 A1 | 6/2006 | Stevens et al. | |
| 2006/0143034 A1 | 6/2006 | Rothermel et al. | |
| 2006/0173668 A1 | 8/2006 | Haigh et al. | |

(Continued)

OTHER PUBLICATIONS

Schulte, "Innovative Vendors in Business Event Management," Feb. 25, 2004, 6 pages, Gartner, Inc. USA.

(Continued)

*Primary Examiner*—Tse Chen
(74) *Attorney, Agent, or Firm*—Senniger Powers LLP

(57) ABSTRACT

Identifying a transaction from a real time event stream having latency. A method of the invention receives events from the real time event stream where events define a plurality of transactions to be identified. Each of the transactions includes a first event and a second event; the first event has a first latency relative to the real time event stream and the second event has a second latency relative to the real time event stream. The first event is identified from the received real time event stream, and a time is record when the first event is received. The method determines a time period during which the second event occurs as a function of the first latency, the recorded time of the first event, and the second latency. The transaction having the first and second events is identified based on the determined time period of the second event.

20 Claims, 8 Drawing Sheets

U.S. PATENT DOCUMENTS

2006/0177058 A1    8/2006    Sarwono et al.
2006/0235907 A1*   10/2006   Kathuria et al. ............. 707/204
2007/0107052 A1    5/2007    Cangini et al.

OTHER PUBLICATIONS

Unknown, "Complex Event Processing (CEP), 'Start Here Guides' from the Navigation Menu," printed from http://cep.weblogger.com/newsitems/departments/cep, last updated on Jan. 17, 2005, 35 pages, Inetco Systems, Ltd., USA.

Unknown, "Transport Processor Module (TSP)", 2004, 4 pages, Pixelmetrix Corporation, USA.

Bouthillier, "Using RealSystems' Event Streams," Tutorials, printed from http://www.streamingmedia.com/tutorials/view.asp?tutorial_id=130, printed on Aug. 24, 2005, 4 pages, Streaming Media, Inc., USA.

Baker, "Telecom Mediation: The Market for Real-Time, Convergent, and Value-Based Mediation for 3G, VoIP, and Advanced IP Services," printed from http://www.technology-research.com/med.htm, Dec. 2004, 9 pages, Dittberner OSS/BSS KnowledgeBase, USA.

Filho, "Yancees: Yet Another Configurable Extensible Event Service," printed from http://awareness.ics.uci.edu/~rsilvafi/yancees/, Jun. 8, 2005, 13 pages, University of California, Irvine, USA.

Drogseth, "Two Worlds Collide," printed from http://www.itworld.com/net/3215/NWW00319243/pfindex.html, Jan. 22, 2001, 2 pages, Network World, USA.

Kay, "Event Correlation," printed from http://www.computerworld.com/printthis/2003/0,4814,83396,00.html, Jul. 28, 2003, 3 pages, Computerworld, Inc., USA.

Vogt, "Event Correlation," Munich Network Management Team, printed from http://wwwmnmteam.informatik.uni-muenchen.de/projects/evcorr/, Feb. 25, 2000, 5 pages, USA.

Rugg et al., "The Real Time Data Management Imperative," Database Trends and Application, printed from http://www.dbta.com/in-depth/mar05;rugg-palmer.html, Mar. 2005, 3 pages, Unisphere Media, LLC, USA.

Unknown, "Eventia Analyzer, security event management made simple," Feb. 4, 2005, 2 pages, Check Point Software Technologies, Ltd., Israel.

Unknown, "Chapter 1: Security Monitor Overview," Using Monitoring Center for Security 1.1, Mar. 24, 2003, 9 pages, Cisco Systems, Inc., USA.

Unknown, "Produce Event Management Applications That Generate Revenue Now, Without Coding," ORION Event Correlation Platform for OEMs, printed from http://www.eventgnosis.com/, 2004, 1 page, EventGnosis, USA.

Unknown, "InCharge Integrated Produce Suite," Products, printed from http://www.smarts.com/products/, 2005, 2 pages, EMC Corp., USA.

Unknown, "Unicenter Automation Point: Centralize Automation, Notify and Remotely Manage Events," Operations Management, printed from http://www3.ca.com/solutions/product.asp?ID=196, 2005, 1 page, Computer Associates International, Inc., USA.

Unknown, "NerveCenter:: Features and Benefits," printed from http://www.open.com/products/nervecenter/whats-new.jsp, available on Nov. 30, 2004, 2 pages, OpenService, Inc., USA.

Unknown, "hp Openview Event Correlation Services (ECS) For Network Node Manager and Operations," Feb. 2003, 2 pages, Hewlett-Packard Co., USA.

Unknown, "IBM Tivoli Omegamon DE for Distributed Systems," IBM Tivoli Omegamon DE for Distributed Systems—Product overview, printed from http://www-306.ibm.com/software/tivoli/produts_omegamon-de-dist-sys/, last updated May 3, 2005, 2 pages, IBM, USA.

Unknown, "IBM Acquires Candle Corporation," IBM Tivoli—IBM acquires Candle Corporation—Welcome, printed from http://www-306.ibm.com/software/tivoli/features/candle/, Feb. 8, 2005, 2 pages, IBM, USA.

Ananth, "Event Consolidation and Correlation, A Practical Approach," printed on Aug. 23, 2005, 27 pages, Prism Microsystems, Inc., USA.

Unkown, "Details," EventTracker: Complete Event Management, printed from http://www.eventlogmanager.com/subpass/details.htm, Sep. 30, 2004, 6 pages, Prism Microsystems, Inc., USA.

Unknown, "Event Correlator," EventTracker Complete Event Management, printed from http://www.eventlogmanager.com/subpass/correlation.htm, printed on Aug. 23, 2005, 3 pages, Prism Microsystems, Inc., USA.

Unknown, "Network Troubleshooting Software for NetView/OpenView," EventWatch, printed on Aug. 23, 2005, 5 pages, Tavve, USA.

Unknown, "KnowNow LiveServer," KnowNow, printed from http://www.knownow.com/products/server/, 2005, 2 pages, KnowNow, Inc., USA.

Unknown, "TIBCO advances Predictive Business through Complex Event Processing," Company, printed from http://www.tibco.com/company/news/releases/press645.jsp, Nov. 10, 2004, 2 pages, TIBCO Software, Inc., USA.

Curtis, "Magic Quadrant for Enterprise Event Management," Research Note, May 29, 2003, 9 pages, Gartner, Inc., USA.

Unknown, "Netcool/OMNIbus Product Family—Realtime, End-to-End Management," Product Family Sheet, 2004, 4 pages, Micromuse Inc., USA.

Unknown, "Netcool Suite Overview," Netcool Products and Solutions, 2005, 2 pages, Micromuse Inc., USA.

Unknown, "Getting Started with Your Installation," Tivoli Software, printed from http://publib.boulder.ibm.com/tividd/td/TRM/GC32-1321-00/en_US/HTML/install38.htm, printed on Aug. 23, 2005, 1 page, IBM, USA.

Unknown, "IBM Tivoli Enterprise Console," IBM Tivoli Enterprise Console—Product Overview, printed from http://www-306.ibm.com/softwrae/tivoli/products/enterprise-console/, last updated on Aug. 9, 2005, 2 pages, IBM, USA.

Rodger, "Tivoli Intelligent Orchestrator and Tivoli Provisioning Management (version 2.1)," Infrastructure Management, Technology Audit, IBM Tivoli, Aug. 2004, 8 pages, Butler Group, UK.

Unknown, "Patrol Enterprise Manager Features, Functions, and Technology Overview," White Paper, Mar. 7, 2005, 30 pages, BMC Software Inc., USA.

Unknown, "Foglight®," Overview, printed from http://www.quest.com/goflight/index.asp, 2005, 2 pages, Quest Software, Inc., USA.

Unknown, "Overview," GemFire Executive Summary, Sep. 2004, 3 pages, Gemstone Systems, Inc., USA.

Unknown, "In the ZOMA® Product Architecture," Rhysome Event-Driven Sense and Respond Solution, printed from http://www.rhysome.com/indexproducts12.html, 2005, 2 pages, Rhysome Inc., USA.

Narayanaswamy et al., "TriggerWare: Making Wise Decisions in an Ever-Changing World," White Paper, printed on Aug. 22, 2005, 5 pages, Cs3, Inc., USA.

Unknown, "Scenario Management," Event Modeler, printed from http://www.apama.com/technology/scenariomanagement.html, 2005, 2 pages, Apama Ltd., UK.

Unknown, "Apama's Technology," Technology, printed from http://www.apama.com/technology/index.html, 2005, 1 page, Apama Ltd., UK.

Unknown, "Event Manager," Technology, printed from http://www.apama.com/technology/eventmanager.html, 2005, 1 page, Apama Ltd., UK.

Unknown, "Trading Strategy Management," Solutions, printed from http://www.apama.com/solutions/tsm.html, 2005, 2 pages, Apama Ltd., UK.

Seeley, "iSpheres Hopes EPL Becomes the SQL of Event Processing," printed from http://www.adtmag.com/print.asp?id=10121, Oct. 13, 2004, 2 pages, 101communications, LLC, USA.

Unknown, "iSpheres Event Server—Real-Time Intelligence and Visibility into Critical Business Events," Products, printed from http://www.ispheres.com/products/products.html, 2005, 3 pages, iSpheres, Inc., USA.

Unknown, "Aligning Existing Systems with Business Processes," Overview, Version: Jul. 21, 2005, 1 page, AptSoft Corporation, USA.

Unknown, "TransactionVision, Technical White Paper," Jun. 2005, 17 pages, Bristol Technology Inc., USA.

Unnown, "Transaction Vision," Products, printed from http://www.bristol.com/transactionvision/, 2005, 2 pages, Bristol Technology Inc., USA.

Unknown, "About RuleCore Technology," Technology, printed from http://www.rulecore.com/tech/index.html, printed on Aug. 23, 2005, 4 pages, MS Analog Software kb, SE.

Unknown, "Event Stream Processing (ESP)," Real Time Division, formerly ObjectStore, printed from http://www.progress.com/realtime/event_stream_processing/index.ssp, printed on Jun. 17, 2005, 2 pages, Progress Software, USA.

Unknown, "Event Engine, Real-time Data Management Infrastructure," Real time Division, formerly ObjectStore, printed from http://www.progress.com/realtime/products/event_engine/index.ssp, printed on Jun. 17, 2005, 2 pages, Progress Software, USA.

Unknown, "About our Customers," Customers, printed from http://www.progress.com/realtime/customers/index.ssp, printed on Sep. 13, 2005, 3 pages, Progress Software, USA.

Cetintemel, "Software Moves Streams in Real Time," printed from http://www.networkworld.com/cgi-bin/mailto/x.cgi, May 2, 2005, 3 pages, Network World, Inc., USA.

Walker, "The Instantly Responsive Enterprise," printed from http://www.infoconomy.com/pages/print/group96435.adp, Jun. 10, 2004, 8 pages, Infoconomy, UK.

Connie Dialeris Green, "Oracle9a Database Performance Tuning Guide and Reference, Release 2 (9.2)," 2002, Oracle Corporation, pp. xxii, 2-13- 2-14, 5-39-5-42, 6-7-6-8, 12-2-12-12.

Notification of Transmittal of The International Search Report and the Written Opinion of the International Searching Authority in International Application No. PCT/US06/17578, dated Aug. 31, 2007, 7 pages.

PIVK, Aleksander, "Intelligent Agents In E-Commerce," Electronic Review Slovenia, Pub 2000, 18 pages.

* cited by examiner

FIG. 1C

Table 126:

| LOGIN TIME | SESSIONID | AGEGROUP | GENDER |
|---|---|---|---|
| 2005-01-01 00:01... | 71 | BELOW 20 | MALE |
| 2005-01-01 00:02... | 5 | BELOW 20 | MALE |
| 2005-01-01 00:03... | 25 | BELOW 20 | MALE |
| 2005-01-01 00:04... | 75 | FROM 20 TO 60 | MALE |
| 2005-01-01 00:05... | 22 | BELOW 20 | FEMALE |
| 2005-01-01 00:06... | 10 | FROM 20 TO 60 | FEMALE |
| 2005-01-01 00:07... | 13 | FROM 20 TO 60 | FEMALE |
| 2005-01-01 00:08... | 7 | FROM 20 TO 60 | MALE |

Table 128:

| LOGIN TIME | SESSIONID | AMOUNT |
|---|---|---|
| 2005-01-01 00:01... | 71 | 37 |
| 2005-01-01 00:03... | 5 | 22 |
| 2005-01-01 00:07... | 25 | 61 |
| 2005-01-01 00:08... | 75 | 73 |
| 2005-01-01 00:14... | 22 | 35 |
| 2005-01-01 00:21... | 10 | 71 |
| 2005-01-01 00:22... | 13 | 65 |
| 2005-01-01 00:24... | 7 | 32 |

Table 130:

| GENDER | AGEGROUP | TOTAL AMOUNT |
|---|---|---|
| FEMALE | BELOW 20 | 1232 |
| FEMALE | FROM 20 TO 60 | 964 |
| FEMALE | MORE THAN 60 | 110 |
| MALE | BELOW 20 | 1706 |
| MALE | FROM 20 TO 60 | 737 |
| MALE | MORE THAN 60 | 359 |

Table 132:

| HOUR | TOTAL |
|---|---|
| 10 | 711 |
| 11 | 597 |
| 12 | 877 |
| 13 | 523 |
| 14 | 938 |
| 15 | 390 |
| 16 | 521 |
| 17 | 551 |

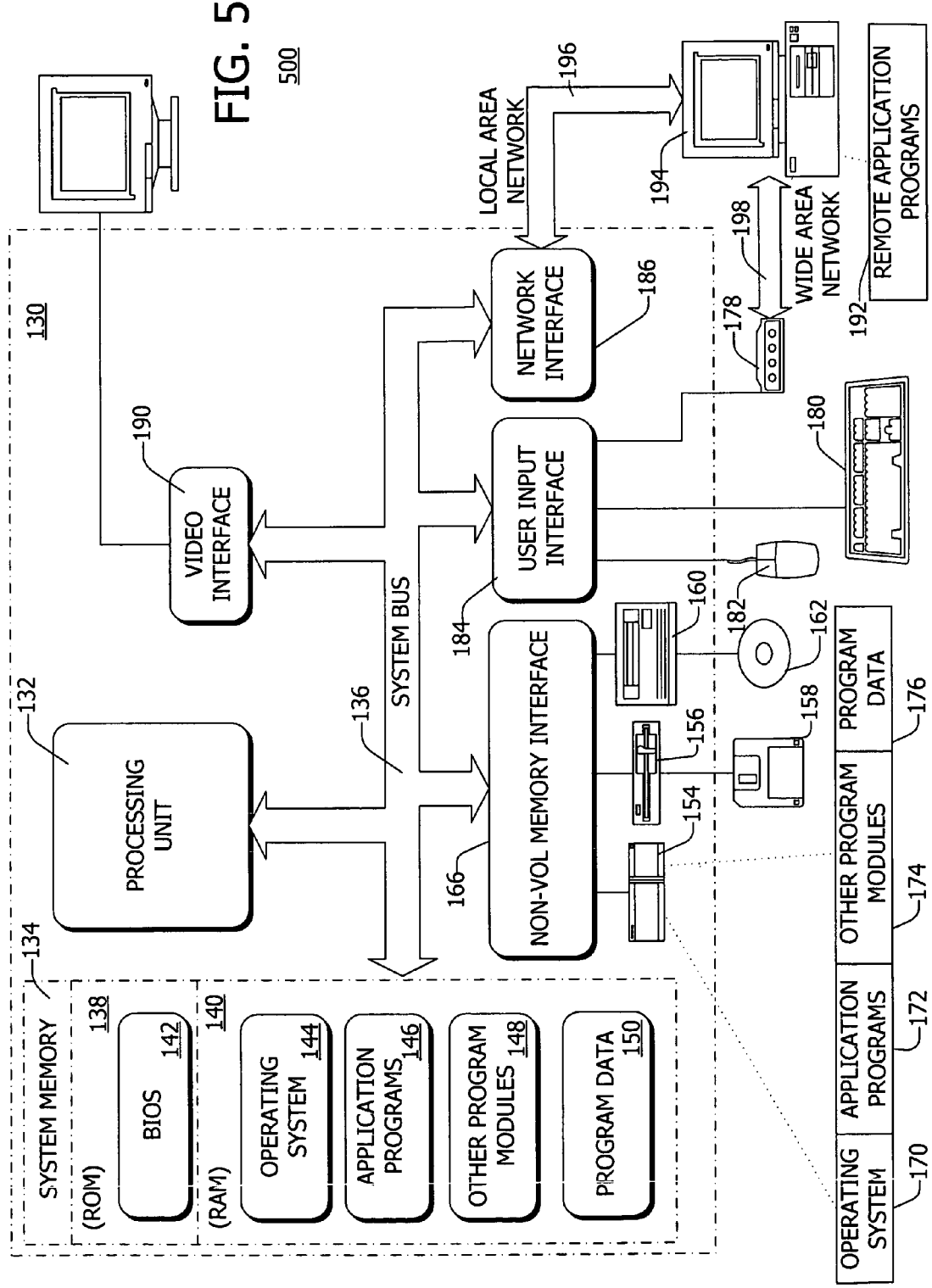

REAL TIME EVENT STREAM PROCESSOR TO ENSURE UP-TO-DATE AND ACCURATE RESULT

BACKGROUND

In the current on-demand and business environment, business entities and enterprises frequently have to make critical decisions in real time. The input for such decisions is based on streams of events received in real time. For example, a bank institution frequently monitors and receives ATM transactions across its service areas. An ATM user may insert or swipe her ATM card at an ATM machine. The ATM user may next make a cash withdrawal, a deposit, an account balance inquiry, or other actions or operations provided by the ATM machine. As these operations are monitored and received by the bank institution as events in real time, the bank institution is required to determine whether a valid ATM transaction has taken place or an ATM fraud has occurred.

Currently, some existing systems may receive and record these and other business events, but the events are not monitored and/or analyzed at real time. Using the ATM transaction example above, the bank institution customarily may receive thousands of ATM transactions per day and data relating to the events are stored in a database or a data store for processing. At a pre-determined time (e.g., around midnight), the stored data is then processed and organized for later retrieval and/or query. It is through this "after-the-fact" processing of the stored data that the bank institution sometimes discovers or determines that an ATM fraud has occurred (such as two ATM transactions by the same ATM card number take place within 20 minutes of each other at two locations 100 miles apart). Such existing systems prove to be inadequate to deal with real time event stream processing.

In other systems, real time monitoring of events may be achieved, but processing and producing an accurate state of the real time events are inadequate. In detecting a possible ATM fraud, suppose events relating to the ATM transactions are received in real time and is subsequently stored in a typical relational database or application for later retrieval or processing by a user. In a typical scenario, an event representing a user's successful entering of her ATM personal identification number (PIN) is followed by a withdrawal event at the same ATM machine. Ideally, the bank institution receives these events in the chronological order in which they occur; that is, an ATM transaction is defined as a PIN entering event followed by a withdrawal event of the user at the same ATM machine. However, as data relating to these events may be transmitted with delays at different stages in the communication network, these events may not be received at the chronological order. As such, the data relating to the withdrawal event may arrive before the PIN entering event. Consequently, if a user of the bank institution wishes to perform a query on the number of completed ATM transactions (e.g., PIN entering and withdrawal) which have taken place, the query may return an inaccurate result because there is no corresponding PIN entering event preceding the withdrawal event. As such, these existing systems lack ability to process real time events while accommodating varying latencies and delays.

SUMMARY

Embodiments of the present invention overcome the shortcomings of the existing systems by processing event streams as received in real time and making the events available for query such that the results of the query are accurate pictures of the events while taking event latencies into consideration. As such, embodiments of the invention process and retrieve data relating to the events with known latency. Alternatively, embodiments of the invention may increase or decrease latencies to guarantee how current the event data is.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Alternatively, the invention may comprise various other methods and apparatuses.

Other features will be in part apparent and in part pointed out hereinafter.

BRIEF DESCRIPTION OF THE DRAWINGS

FIGS. 1A-1C are diagrams illustrating examples of an existing system's method of processing an event stream received in real time according to one embodiment of the invention.

FIG. 5 is a block diagram illustrating one example of a suitable computing system environment in which the invention may be implemented.

Corresponding reference characters indicate corresponding parts throughout the drawings.

DETAILED DESCRIPTION

Figure 1A:
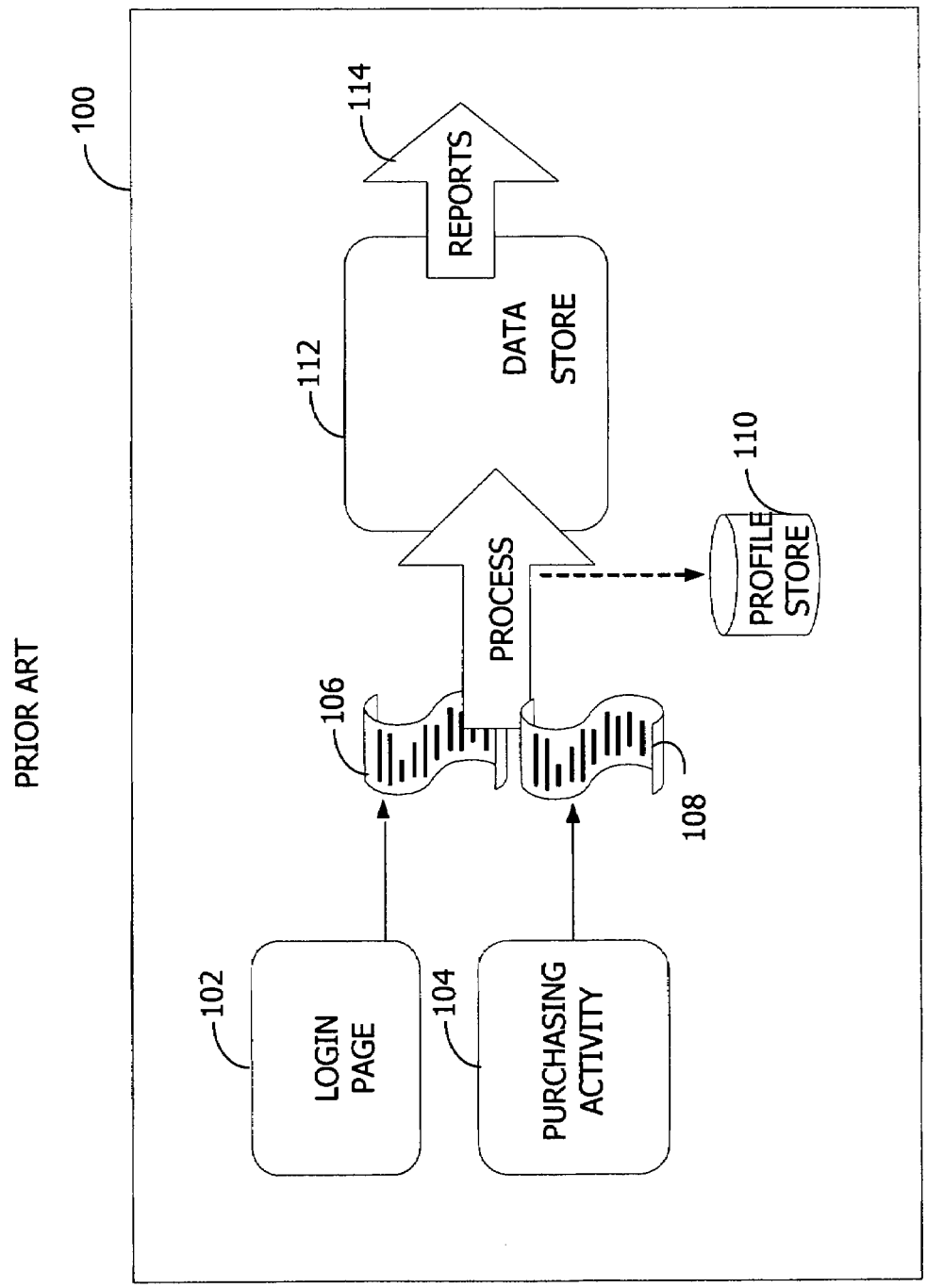
Figure 1B:
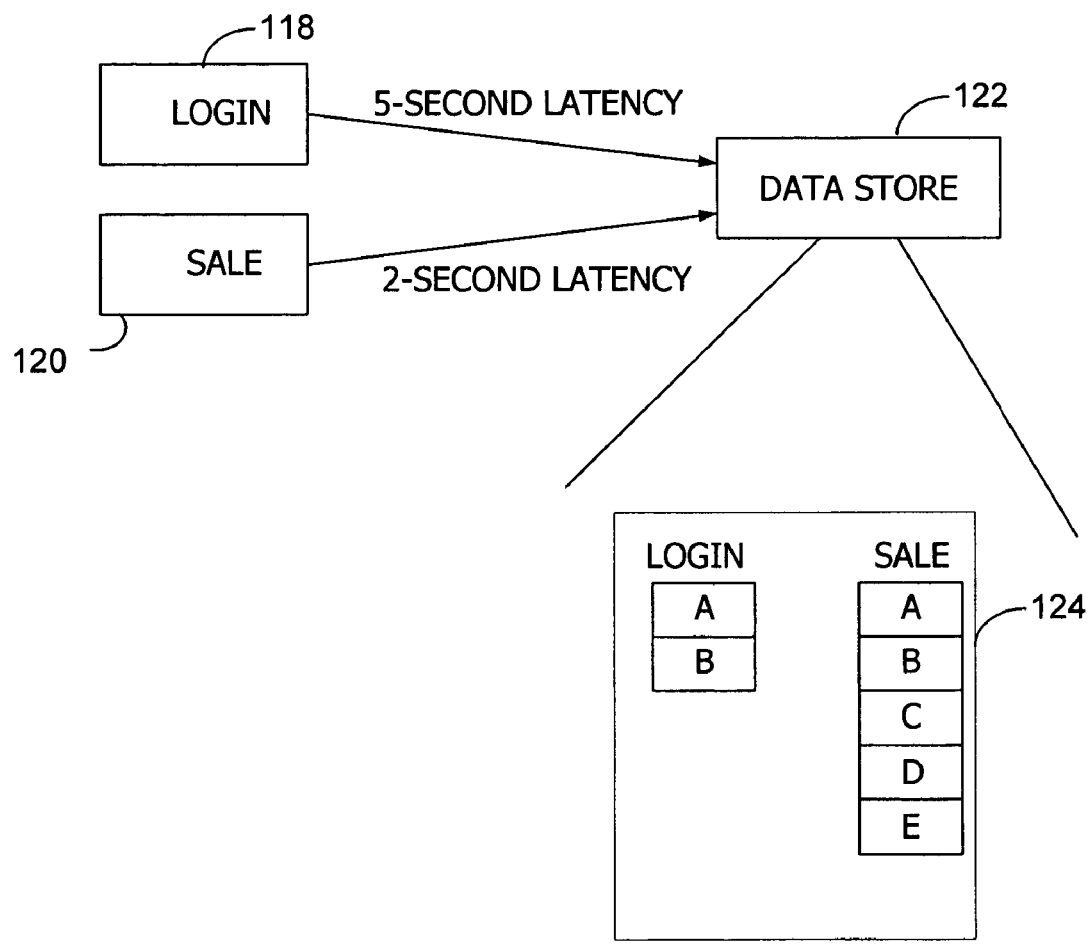

Referring first to FIGS. 1A-1C, diagrams illustrating an existing system 100 for processing a real time event stream. As used herein, real time event stream means an event stream received in real time wherein each event has a latency (which may vary) from the instant occurrence of the event to the instant occurrence receipt of the event in the event stream. For example, the real time event stream includes events that define an online sales transaction, which includes a login event and a sales event by one customer. In another example, an ATM transaction includes a PIN entering event followed by a cash withdrawal at the same ATM machine where the PIN entering event occurs. It is to be understood that transactions may be defined by two or more events in the real time event stream from multiple sources without departing from the scope of the present invention (e.g., five events may define a transaction).

In the existing system 100, the real time event stream is received from two sources, a login page event stream 102 and a sales event stream 104. For example, the existing system 100 may be an online merchant selling sporting goods, such as various sporting equipment (e.g., basketball, golf clubs, or the like), sports apparel, and/or other outdoor activity equipment. The online merchant operates a web site with one or more web pages displaying the sporting goods. An online shopper may be required to login to the web site at a designated login page to proceed with her purchase. As she browses through the merchant's selections from web page to web page, she may select a desired item and place it in her online shopping cart. After she completes her selections, she may proceed to checkout to complete her sporting goods purchase with the online merchant. Similarly, in any given day, other online shoppers may conduct a similar series of transactions in purchasing their sporting goods.

Still referring to FIG. 1A, the login page event stream 102 receives login events and the sales event stream 104 receives sales events throughout the day in real time as a part of the existing system 100. However, the existing system 100 typically does not process the login events and sales events in real time. Instead, the login events are typically stored in a log file 106. Similarly, the sales events are stored in a log file 108. The collected event data in the log files 106 and 108 is then batch-processed at the end of the business day, or on some other schedule. The result of this processing the login events is shown in a table 126 in FIG. 1B. For example, each row in the table 126 describes a login time of an online shopper, a session identification (ID) assigned to the online shopper, the age group of the online shopper (may be collected from the online shopper when she first registers with the online merchant) and the gender of the online shopper. Similarly, the sales events are stored in a table 128 in FIG. 1C. For example, each row in the table 128 describes the time when the sales takes place, the session ID associated with the sale and the amount of the purchase. It is to be understood that other information may be gathered and stored in the table 126 or 128.

The tables 126 and 128 are usually managed by a relational database management system (RDBMS) which contains all login events and sales events. As an illustration, as the log file 106 includes numerous online shoppers' login events, the data store 112 correlates shopper A's login event with shopper A's sales event from the log file 108. During the batch processing additional information may be retrieved via lookups. For example a profile store 110 stores data relating to a shopper's profile, such as the shopper's age, gender, ethnicity, shipping location, total amount of purchase, or other demographics data for additional processing.

After the data store 112 contains both the login events and the sales events, the online merchant may perform a query to produce reports 116 relating to the sporting goods transactions at its online store. In one alternative embodiment, the query from the user is for retrieving received events relating to the identified transaction and the query is continuously processed with respect to the real time event stream to provide a query result which is independent of the latency of the events. For example, the online merchant may be interested to learn which gender purchases her products online so she may vary her product line or inventory accordingly. A table 130 illustrates an exemplary report showing the total amount purchased by different age groups within a given gender. Such table 130 may be produced by a typical structured query language (SQL) statement such as:

select   Gender,AgeGroup,sum(Amount)   as   "Total Amount"
    from   LoginTable   join   SalesTable   on LoginTable.SessionID=SalesTable.SessionID
    group by Gender, AgeGroup
    order by Gender, AgeGroup In one embodiment, this allows obtaining query results in the form of consistent data view that can be accessed with SQL and obtaining query results as output event (report) that represents a snapshot of the query results as of given moment of time.

Similarly, the online merchant may also be interested to learn when online customers shop most frequently in a given day. A table 132 illustrates an exemplary report showing the total amount of sales in a given hour in a day. Likewise, the table 132 may be produced by executing a typical SQL statement, such as:

SELECT
    datediff(hour,'Jan. 1, 2005',SaleTime)+10 as hour,
    sum(Amount) as Total
    FROM   LoginTable   join   SalesTable   on LoginTable.SessionID=SalesTable.SessionID
    GROUP by datediff(hour,'Jan. 1, 2005',SaleTime)
    ORDER by datediff(hour,'Jan. 1, 2005',SaleTime)

Still referring to FIG. 1A, in order for the existing system 100 to produce reports such as tables 130 and 132, the relevant data must have been stored in the data store 112 prior to the execution of the SQL statements described above. In other words, while the login page event stream 102 and the sales event stream 104 receive events in real time, the processing of the received events occurs on scheduled basis at much later moment in time.

One of the challenges related to real-time event processing is the impact on the latency. FIG. 1B is a diagram illustrating a snapshot of a system that receives and processes events in real time. In this example, a login event stream 118 receives login events with a five-second latency and a sales event stream 120 receives sales events with a two-second latency. This latency may vary. For this example, it is assumed that the latency for similar events are the same. To further illustrate the example of how latencies of the login and sales events affect the time when the data store receives the events, Table 1 describes an example of sales activities of five online shoppers (A to E):

TABLE 1

Real time login and sales events with latencies

| User | Event Type | Time | Latency (in seconds) | Time when events arrive at the data store |
|---|---|---|---|---|
| A | Login | 10:00:00 AM | 5 | 10:00:05 AM * |
| A | Sales | 10:00:01 AM | 2 | 10:00:03 AM * |
| B | Login | 10:00:01 AM | 5 | 10:00:06 AM * |
| B | Sales | 10:00:02 AM | 2 | 10:00:04 AM * |
| C | Login | 10:00:03 AM | 5 | 10:00:08 AM |
| C | Sales | 10:00:03 AM | 2 | 10:00:05 AM * |
| D | Login | 10:00:03 AM | 5 | 10:00:08 AM |
| D | Sales | 10:00:04 AM | 2 | 10:00:06 AM * |
| E | Login | 10:00:04 AM | 5 | 10:00:09 AM |
| E | Sales | 10:00:05 AM | 2 | 10:00:07 AM * |

As shown above in Table 1, user A logs into the online merchant site at 10:00:00 AM. This login event is to arrive at the data store 122 at 10:00:05 AM due to the latency of five seconds. Similarly, user A makes a purchase at 10:00:01 AM. However, this sales purchase would arrive at the data store 122 at 10:00:03 AM due to a 2-second latency. Similarly, user B's login at 10:00:01 AM will not arrive at the data store 122 until 10:00:06 AM while his sales event at 10:00:02 AM would arrive at 10:00:04 AM at the data store 122. As such, the data store 122 receives in real time sales events before the corresponding login events due to the different latency or delay of the login events and the sales events. Hence, at 10:00:07 AM, only the events shown in block 124 have been received by the data store 122 (The received events are also noted by asterisks (*) in Table 1).

Referring again to FIG. 1B, the block 124 shows that the data store 122 has received the sales events of users C, D, and E at 10:07 AM, but the corresponding login events for the sales events of users C, D, and E have not arrived because of the latency. As such, if the online merchant wishes to know "how many purchase orders have been received by female shoppers at 10:07 AM?" using a similar SQL statement described above, the data store 122 would include the sales by users C, D, and E even though the corresponding login events have not been received.

Embodiments of the invention solve the above difficulties by recording a time for each event in the transaction in an event stream received in real time and determining a time period when related event of the transaction should be or have been received as a function of the latencies of the events and the recorded time.

Figure 2:
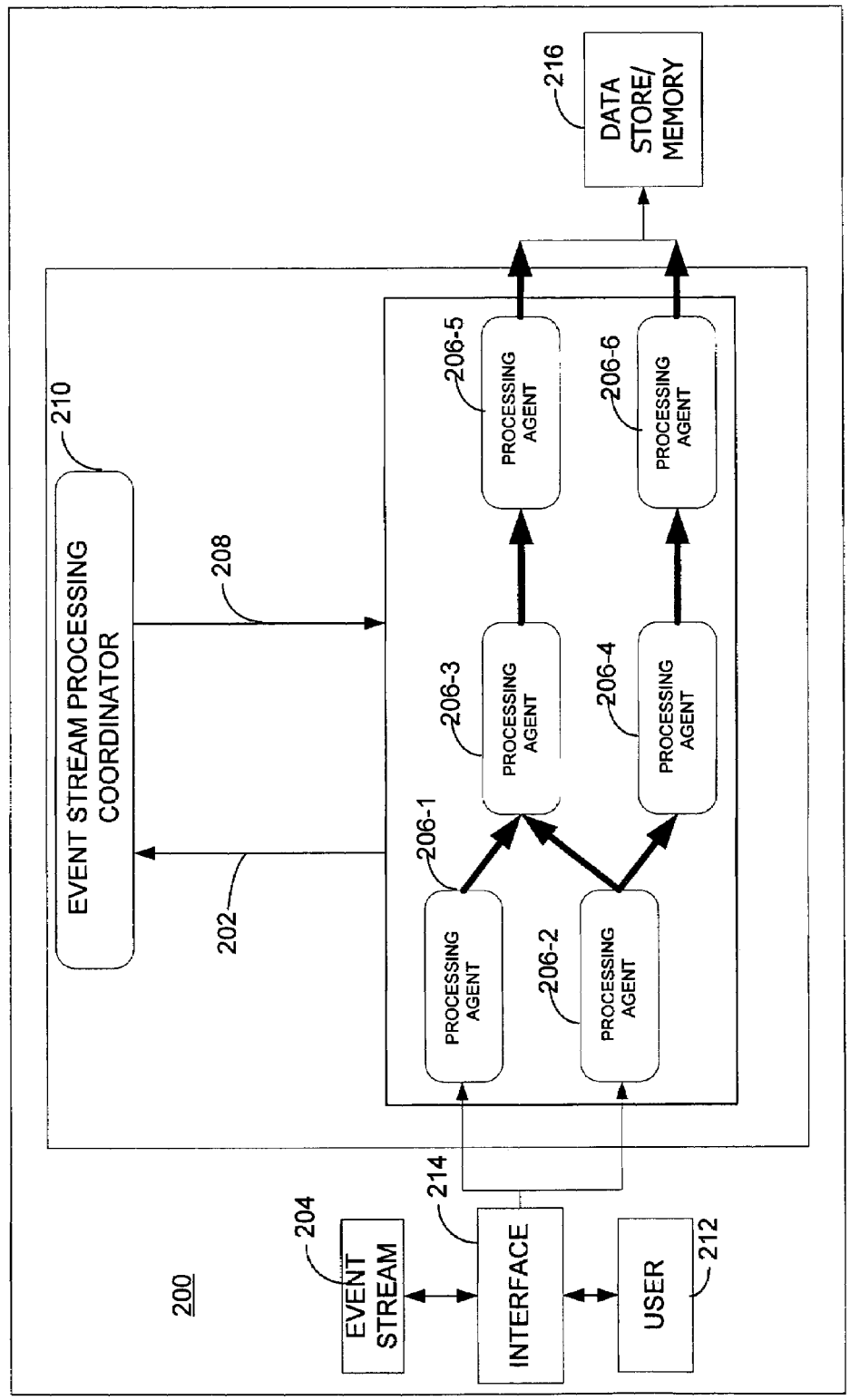
FIG. 2 is a block diagram illustrating a system for identifying a transaction from an event stream received in real time according to one embodiment of the invention.

Referring now to FIG. 2, a diagram illustrates a system 200 for identifying a transaction from a real time event stream according to one embodiment of the invention. For example, the system 200 may be a computing system such as a computer 130 in FIG. 5, a computing device, a computer server, a plurality of computer servers, or other computing device that is capable of executing computer-executable instructions, applications, application software, computer-executable routines or codes. In another embodiment, the system 200 includes computing devices in a distributed system in which the computing devices are connected by a common communication network, such as an intranet, an internet, or the like.

In another embodiment, the system 200 includes an interface 214 for receiving a query from a user 212. The system 200 also includes a processor (not shown), which associates with the interface 214, processes instructions or commands from the user 212 or executes computer-executable instructions. For example, the processor executes a plurality of processing agent components 206 forming a plurality of processing nodes and an event stream processing coordinator 210, which is associated with the processing agent component 206, which include computer-executable instructions, computer-executable routines, applications, application programs, or the like. The agent components 206 and the coordinator 210 may be one device/machine/process or the system and method may be configured to have the capability to distribute the event processing nodes and the coordinator on different devices/machines/processes. The system 200 also includes a data store or memory 216 which may be a volatile, non-volatile, a system memory 134 or a non-volatile memory interface 166 of FIG. 5, or other computer-readable medium for storing data.

Still referring to FIG. 2, a real time event stream 204 transmits to the processing agent components 206 through the interface 214 a plurality of events where the events define a plurality of transactions to be identified. For example, the real time event stream 204 may include a plurality of ATM transactions made across a vast geographical region, such as the territory of the United States of America. In another example, the real time event stream 204 may include online sales transactions of an online store which receives purchase orders from around the globe. In a further example, the real time event stream 204 may include online login and log-out sessions of a university's email system.

By supplying the real time event stream 204 to the processing agent components 206, the events are processed by each of the processing agent components 206 to generate or create composite events or reports as data to be further processed. For example, the processing agent component 206-1 or 206-2 receives the events from the real time event stream 204 and the result of the processing (to be discussed in further detail below) is sent to the processing agent component 206-3 or 206-4. As such, embodiments of the invention include a cascading set of processing agent components 206 for processing the events from the event stream 204. In an alternative embodiment, there may be additional real time event streams such as the real time event stream 204 or the event stream after being processed by a previous set of processing agent components 206 (e.g., processing agent component 206-1) providing events to the processing agent components 206.

As each of the processing agent components 206 receives events from the real time event stream 204 defining a plurality of transactions, each of the plurality of transactions includes a first event and a second event. For example and for simplicity, an ATM transaction may include a PIN entering event and a cash withdrawal event. An online transaction may include a login event and an order placing/sales event. In another illustration, an online session transaction may include a login event to an email server and a log-out event from the email server. Also, the first event may have a first latency relative to the real time event stream 204 (e.g., a varying delay from the instant of occurrence to the instant of receipt as part of the event stream 204) and the second event may have a second latency relative to the real time event stream 204 (e.g., a varying delay from the instant of occurrence to the instant of receipt as part of the event stream 204). For example, the online login event may have a 5-second latency while the sales event may have a 2-second latency in the online sales transaction example. It is to be understood that although the real time event stream 204 receives the events in real time, the processing agent component 206 may receive the events from the real time event stream 204 with various delays or latencies due to factors such as data transmission, system processing, temporary memory allocation, reading memory locations, frequency of the processing quanta, batch size in receiving the events from the real time event stream 204, or the like. As another example, in a distributed system where a plurality of real time event streams receives events and where each real time event stream receives only one type of events of a transaction, the latency of each type of events for the defined transaction may vary.

In one embodiment, the first latency or the second latency is pre-determined or known. For example, the processing agent component 206 may receive the first latency or the second latency from the system 200. For example, when the system 200 is operated in a distributed computing environment where a plurality of servers handle or transmit real time events and each server transmits one type of events to the event stream 204, the system 200 may provide such known latency information to the processing agent component 206 and store such information in the memory 216. In an alternative embodiment, they system 200 may determine the first latency or the second latency by monitoring the rate in which the first event or the second event is received by the at the event stream 204.

Still referring to FIG. 2, the processing agent component 206 records a time or an event watermark in the memory 128 when the first event (such as online sales event) is received. For example, if user A logs into the online merchant's web site at 10:00:04 AM, the event stream processing coordinator 210 records the time 10:00:04 AM for the first event after identifying the login event from the real time event stream 204. Also, data relating to the first latency and the second latency is recorded and/or stored in the memory 128.

As events from the real time event stream 204 are received, the event stream processing coordinator 210 identifies the first event from the plurality of events received by the processing agent component 206. In the online sales transaction example, the event stream processing coordinator 210 or the processor identifies an online login event from the plurality of events from the real time event stream 204. The online login event may also include a session ID, an originating Internet protocol (IP) address, a Referrer name, or other identifying or demographics data associated with the online login event (such as data shown in table 124 in FIG. 1C). In one embodiment, the event stream processing coordinator 210 also records the included data in each of the online login event.

Next, the event stream processing coordinator 210 determines a time period during which the second event is to be received as a function of the first latency, the recorded time of the first event, and the second latency. Using the online store purchase as an example, the login event has a recorded time of 10:00:04 AM and with a latency of, for example, 5 seconds. The processing agent component 206 also records the second latency, such as a sales event, of 2 seconds in the memory 128. As such, the event stream processing coordinator 210 determines a time period during which the second event is to be received as a function of the first latency (i.e., 5 seconds), the recorded time of the first event (i.e., 10:00:04 AM), and the second latency (i.e., 2 seconds). In this example, the determined time period may be between 10:00:06 AM to 10:00:09 AM (See further example in FIG. 3B) by calculating the minimum and the maximum between the first latency and the second latency.

In one embodiment, the event stream processing coordinator 210 adjusts the latency and/or the recorded time of the first event by sending a signal via an interface or a connection 208 to the processing agent component 206 in the event of malfunction or operation error in the processing agent component 206 or the event stream 204. In this embodiment, the system 200 records and stores a part of the event 204 and the state of the processing agent component 206 in a storage such as the memory 216. In the event that event stream 204 or the processing agent component 206 crashes or causes unknown delays, the event stream processing coordinator 210 may retrieve from the memory 216 the previous state of the processing agent component 206 or part of the event stream 204 to reprocess the events in the event stream 204 and rebuild their state to recover the event stream Thus, the event stream can be recovered from a crash, so that the result is still correct and, substantially, the impact of the crash was increased latency while the stream is being recovered. As such, the event stream processing coordinator 210 may command the processing agent component 206 to reset the time or the event watermark by sending the signal via the interface or the connection 208. In an alternative embodiment, it is contemplated that the event stream processing coordinator 210 processes and handles only watermarks so that no events or data flow through the event stream processing coordinator 210.

In an alternative embodiment, the event stream processing coordinator 210 increases or decreases the first latency or the second latency to provide a definite or set delay time. For example, the system 200 may monitor the flow of the events in the event stream 204. In one embodiment, this may include each processing agent 206 sending its watermarks to the event stream processing coordinator 210 via a connection 202. Among other things, this allows the event stream processing coordinator 210 to estimate the total latency and identify the reasons for the latency. Thus, depending on the identified reasons for the latency, the mode of operation of the event stream processing coordinator 210 may vary to include operating with a minimum possible latency as a function of the real time stream of events or with a guaranteed latency as configured by a user. In addition, this allows the event stream processing coordinator 210 to determine when the processing agent component 206 is using excessive amount of system resources due to the first latency or the second latency. As such, the system 200 provides such determination to the event stream processing coordinator 210 by sending a signal via an interface or the connection 202 to reduce or decrease the first or second latency. The processing agent component 206 may decrease the first latency or the second latency by using a different batch size in receiving the events from the real time event stream 204 or increasing or decreasing the frequency of processing event quanta from the real time event stream 204. The event stream processing coordinator 210 may also reallocate resources for the processing agent component 206 by request more resources from the system 200, or the like. In a further alternative embodiment, the event stream processing coordinator 210 may receive an input from the user through the interface 214 to increase or decrease the first latency or the second latency. In addition, this allows the user to configure the latency to specify a particular (e.g., guaranteed) latency. This results in the capability to obtain the same query results as if all events were collected in advance a relational database management system (RDBMS) and the query was applied to the collected results in the RDBMS. In one alternative embodiment, the query result obtained is in the form of consistent data view that can be accessed with SQL and/or as output event (report) that represents a snapshot of the query results as of given moment of time.

In an alternative embodiment, the events from event stream, such as the real time event stream 204, may be received in chronological order as the events occur or are received. As an illustration, referring again to Table 1, the login event A happens at 10:00:00 and another login event B happens at 10:00:01. The system 200 received first A at 10:00:05 and then B at 10:00:06, where 5 seconds were the latency of transporting and processing the events. By receiving events in a chronological order, the concept of "Event Stream Watermark", which is the timestamp of the last event received from this stream enables the system 200 to indicate that no more events older than this timestamp will be received. In one alternative embodiment in which the event stream is ordered, the concept of the event stream watermark includes a timestamp or other indicator indicative of events which have been received from an ordered event stream and what events are yet to come from the ordered event stream. In the example here once the login B is received, the watermark for the login stream becomes 10:00:01, and means that there will be no more events that occurred earlier than 10:00:01 from the login stream.

In this embodiment, for example, the event stream watermark applies only to one specific event stream from a given source. The events from different streams may still be received out of order. In Table 1's example, there are two different event streams with two different latencies—one for the login events and another for the sale events. The sales event B that is received at 10:00:04 sets the watermark for the stream of sale events to 10:00:02 to indicate that no more sales events earlier than this timestamp are expected. This does not prevent earlier events to be received from other streams, such as the Login even B which is received two seconds later at 10:00:06, but actually happened one second earlier at 10:00:01.

In a further embodiment of the invention, the input streams may be partially ordered—that is, it may be possible to receive an event earlier than another event previously received, but only up to certain known time interval. For example, the system 200 may receive an event E3 and then another event E2 that happened 10 seconds before E3. The partially ordered event stream may be converted to a fully ordered event stream by simply buffering and sorting the events before processing. It is to be understood that the conversion of partially ordered event stream may increase latency. For example, the system 200 may include a one-minute buffer while sorting the events to obtain a fully ordered event stream at the cost of introducing additional latency of one minute.

Figure 3A:
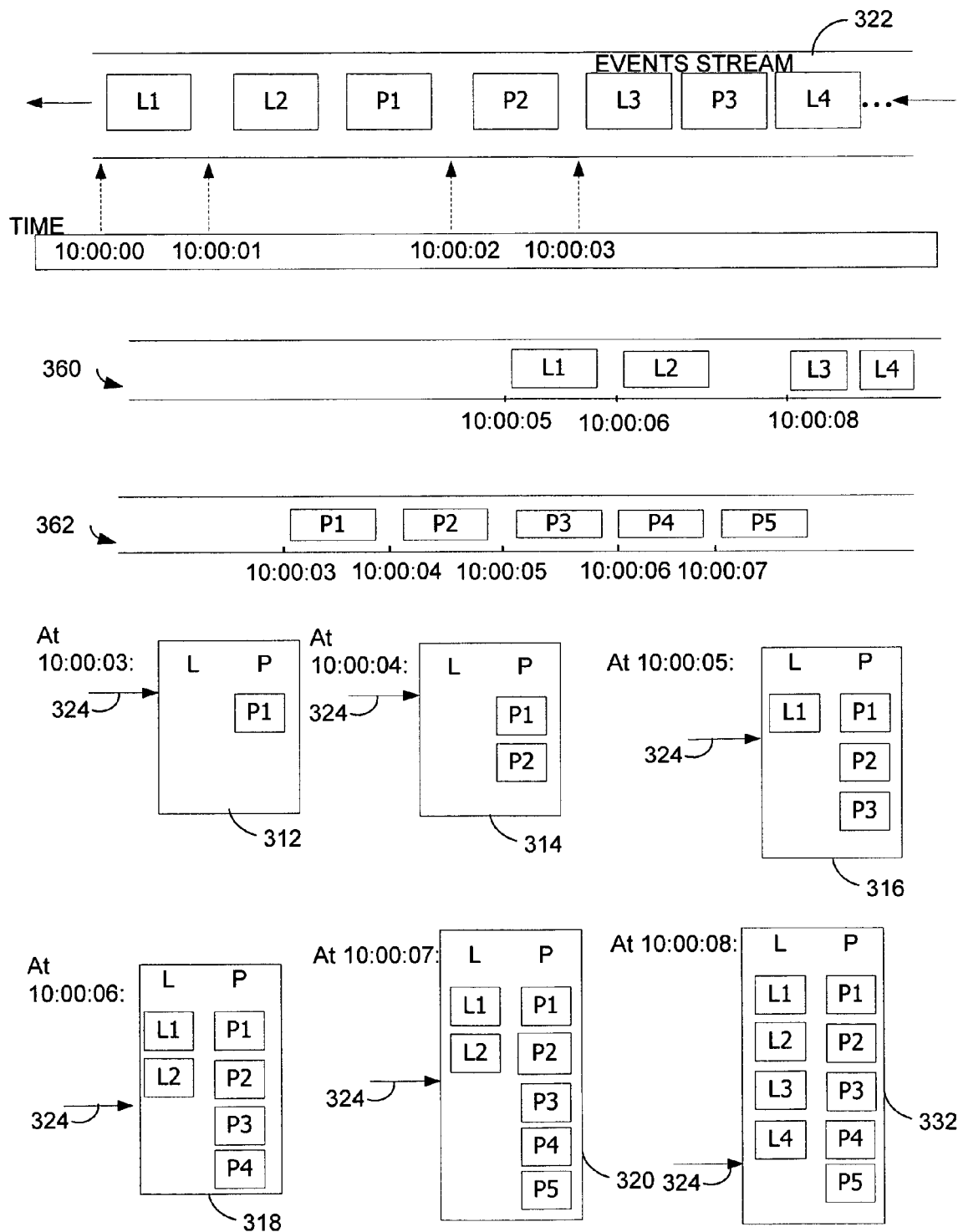
FIGS. 3A-3B are diagrams illustrating identifying a transaction by recording a time for an event in an event stream received in real time for defining a time period when a subsequent related event is to be expected or has occurred as a function of the real time event stream latency according to one embodiment of the invention.

Referring now to FIG. 3A, a diagram illustrates identifying a transaction by recording a time for an event in an event stream received in real time for defining a time period when a subsequent related event is to be expected to receive or has been received as a function of the event stream latency according to one embodiment of the invention. In particular, FIG. 3A provides an exemplary illustration of how the processing agent component 206 and the event stream processing coordinator 210 process events from a real time event stream 322. For simplicity, events in the examples in FIG. 3A define a transaction T, where the transaction T includes a login event (L) and a sales event (P), and describes the login and sales events according to Table 1.

For example, a transaction T1 includes a login event L1 and a sales event P1 for user A, while a transaction T2 represents a login event L2 and a sales event P2 for user B. Similarly, a transaction T3 represents a login event L3 and a sales event P3 for user C, a transaction T4 represents a login event L4 and a sales event P4 for user D, and a transaction T5 represents a login event L5 and a sales event P5 for user E. It is to be understood that the real time event stream 322 may include other events defining other transactions. Also, for simplicity, a first latency for the login event is 5 seconds and a second latency for a purchase event is 2 seconds. In addition, the start time of illustration in FIG. 3A is at 10:00:00.

As shown in FIG. 3A, the event stream 322 includes the following sequential series of events: L1, L2, P1, P2, L3, P3, and L4 and so on. Also, the processing agent component 206 records the first latency for L events and the second latency for P events as they are received. A login event stream 360 includes all login events L after the 5-second latency and a sales event stream 362 includes all sales events P after the 2-second latency.

At 10:00:00, when the login event L1 is received from the events stream 322, the login event will not appear in the login event stream 360 until 10:00:05 because of the 5 second latency. Similarly, the login event L2, which is received at 10:00:01, will not appear in the login event stream 360 at 10:00:06. However, the sales event P1, which is received at 10:00:01 by the events stream 322, will appear in the sales event stream 362 at 10:00:03 because there is only 2-second latency for sales events. As such, at 10:00:03, a block 312 indicates that the processing agent component 206 from the sales event stream 362 receives event P1. The event stream processing coordinator 210 identifies event P1 and the processing agent component 206 records a time when the event P1 is received (10:00:03). The event stream processing coordinator 210 also indicates such recorded time. Transactions above a query arrow 324 represent all transactions T received prior to the time indicated by query arrow 324 have been received or have been recorded. In other words, the query arrow 324 is a point in time above which all transactions are complete. In one embodiment, the query arrow 324 indicates that the transactions T's received prior to the time indicated by the query arrow 324 are available for query. As the transaction is defined to include an L event and an P event, the event stream processing coordinator 210 determines a time period when the second event, L1, occurs as a function of the recorded time of P1, the first latency of L1, and the second latency of P1. In this illustration, the time period is between 10:00:05 (10:00:03+2 seconds) and 10:00:08 (10:00:03+5 seconds).

At time 10:00:04, a block 314 indicates that the processing agent component 206 receives another event P2. Again, the event stream processing coordinator 210 identifies P2 and a time when the event P2 is received 10:00:04 is recorded. As a transaction is defined to include an L event and an P event, the event stream processing Coordinator 210 determines a time period during which the second event, P2, will occur in the event stream 322 as a function of the recorded time of P2, the first latency of P2, and the second latency of L2. In this illustration, the time period is between 10:00:06 and 10:00:09. At this point in time, the processing agent component 206 has not received the corresponding second event L1 of T1, and therefore the query arrow 324 remains at 10:00:03 because the transaction T1 has not been identified.

At time 10:00:05, a block 316 indicates that the processing agent component 206 receives an event L1 from the login event stream 360, and the event stream processing coordinator 210 identifies L1 with a recorded time of 10:00:05. In determining a time period during which L1 will be found in the event stream 322 as a function of the recorded time of L1, the first latency of L1, and the second latency of P1, the event stream processing coordinator 210 would identify the transaction having the first event L1 and the second event P1 based on the determined time period of the second event. In other words, the event stream processing coordinator 210 identifies the transaction T1 because L1 and P1 have been received. As such, the query arrow 324 notes a time of 10:00:05 to indicate that the transaction T1 is available for query by the user 212.

At the same time, the processing agent component 206 also receives an event P3 from the sales event stream 362, and the event stream processing coordinator 210 identifies P3 with a recorded time of 10:00:05. The event stream processing coordinator 210 determines a time period during which the second event, L3, will occur in the event stream 322 or with the 5-second delay in login event stream 360 as a function of the recorded time of P3, the first latency of P3, and the second latency of L3. In this illustration, the time period is between 10:00:08 and 10:00:10.

By using the query arrow 324, or a missing event watermark, alternative embodiments of the present invention identify completed transactions which may be queried at any point in time while maintaining an accurate picture of the events with a known latency. In one alternative embodiment, the missing event watermark is calculated simply as the minimum of the watermarks of all input streams. Instead of making all events available for query as the events are received, alternative embodiments of the invention advantageously determine the complete picture of the transactions by only presenting completed transactions for query. In one alternative embodiment, the portion of the event stream that can be used to draw conclusions from the events can be separated or segregated from events that are received but not yet useful for processing. In another alternative embodiment, the processing agents keep the internal state of each watermark and align the input event-stream-watermarks to achieve consistency. For example, suppose the real time events define ATM transactions and a user performs a query to monitor the number of ATM transactions at any given time. The prior systems capable of real time event processing would make all events available for query, which may return a result indicating there may more cash withdrawal events than PIN-entering events due to latency. Alternatively, a query result may indicate that there have been two cash withdrawal events of the same account at two ATM machines 20 miles away within 10 minutes without receiving any PIN-entering event related to the account. However, in actuality, the two cash withdrawal events may be valid events because the two PIN-entering events have occurred and the account may be a joint account with two ATM cards. As such, embodiments of the present invention overcome the shortcomings of prior systems and efficiently process real time events and transaction.

At time 10:00:06, a block 318 indicates that the processing agent component 206 receives an event L2, and the event stream processing coordinator 210 identifies L2 with a recorded time of 10:00:06. In determining a time period during which L2 will be found in the event stream 322 as a function of the recorded time of L2, the first latency of L2, and the second latency of P2, the event stream processing coordinator 210 identifies the transaction having the first event L2 and the second event P2 based on the determined time period of the second event. In other words, the event stream processing coordinator 210 identifies the transaction T2 because L2 and P2 have been received. As such, the query arrow 324 indicates a time of 10:00:06 to indicate that transactions T1 and T2 are available for query by the user 212.

Also at 10:00:06, the processing agent component 206 also receives an event P4 from the sales event stream 362, and the event stream processing coordinator 210 identifies P4 with a recorded time of 10:00:06. The event stream processing coordinator 210 determines a time period during which the second event, L4, will occur in the event stream 322 or with the 5-second delay in login event stream 360 as a function of the recorded time of P4, the first latency of P4, and the second latency of L4. In this illustration, the time period is between 10:00:09 and 10:00:11.

As such, embodiments of the invention receive events from one or more event streams where each of the event streams may be subjected to different latency or delays.

At time 10:00:07, a block 320 indicates that the processing agent component 206 receives another event P5. Again, the event stream processing coordinator 210 identifies P5 and the time of 10:00:07 is recorded. The event stream processing coordinator 210 determines a time period during which the second event, L5, occurs as a function of the recorded time of P5, the first latency of P5, and the second latency of L5. In this illustration, the time period is between 10:00:09 and 10:00:12. At this time, the processing agent component 206 has not received the corresponding second event L5 of T5, and therefore the query arrow 324 remains at 10:00:05 because the transaction T5 has not been identified.

At time 10:00:08, a block 332 indicates that the processing agent component 206 receives events L3 and L4, and the event stream processing coordinator 210 identifies L3 and L4 with a recorded time of 10:00:08. In determining a time period during which the second event P3 and P4 is to be received as a function of the recorded time of L3 and L4, the first latency of L3 and L4, and the second latency of P3 and P4, the event stream processing coordinator 210 identifies the transaction T3 having the first event L3 and the second event P3 and the transaction T4 (i.e., L4 and L4) based on the determined time period of the second event. In other words, the event stream processing coordinator 210 has identified the transactions T3 and T4 because the processing agent component 206 has received L3 and P3, and L4 and P4, respectively. As such, the query arrow 324 indicates a time of 10:00:08 to indicate that transactions T1, T2, and T3 are available for query by the user 212.

Likewise at 10:00:08, the processing agent component 206 also receives an event P5 from the sales event stream 362, and the event stream processing coordinator 210 identifies P5 with a recorded time of 10:00:08. The event stream processing coordinator 210 determines a time period during which the second event, L5, will occur in the event stream 322 or with the 5-second delay in login event stream 360 as a function of the recorded time of P5, the first latency of P5, and the second latency of L5. In this illustration, the time period is between 10:00:10 and 10:00:13.

Figure 3B:
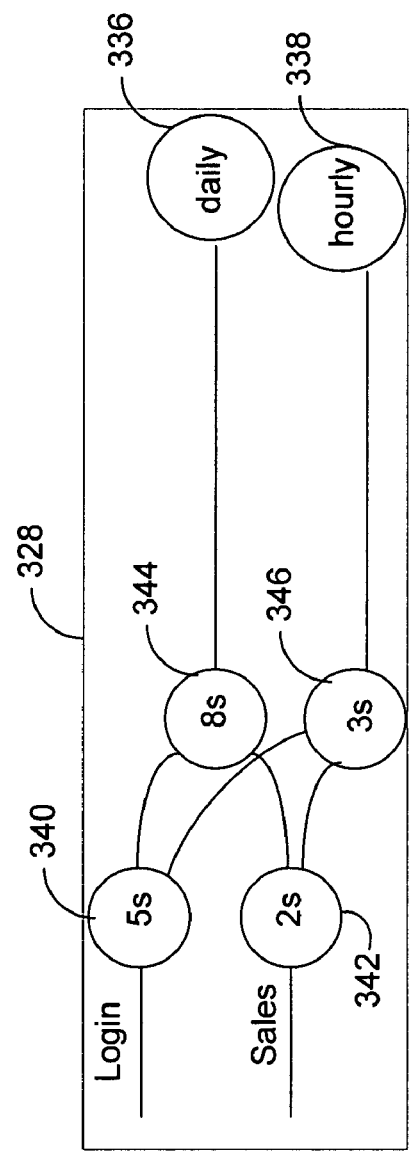

Referring now to FIG. 3B, a diagram illustrates a timing diagram 328 in determining a time period during which a second event is to be received as a function of a recorded time of the first event, a first latency of the first event, and a second latency of the second event. In particular, this example illustrates how embodiments of the present invention identify online sales transactions and produce a daily report 336 of how many sales transactions have occurred in a day or an hourly report 338 of how many sales transactions have occurred in an hour. The diagram 328 illustrates two events, a login event and a sales event; the login event has a login latency 340 of 5 seconds and the sales event has a sales latency of 2 seconds.

In addition, there are a daily report latency 344 of 8 seconds for preparing the daily sales report 336 and a hourly report latency 346 of 3 seconds for preparing the hourly sales report 338. For example, it may take up to 8 seconds for the system 200 to execute computer-executable instructions to process the login events and/or the sales events to create a daily report. Alternatively, the daily report latency 344 or the hourly report latency 346 represents the delay or latency in making the transaction available for query by the user.

Therefore, in identifying the transaction from an event stream including real time events, the event stream processing coordinator 210 determines or estimates the time to generate a daily sales report by adding the daily report latency and the maximum latency between the login latency and the sales latency. That is the maximum latency is 8+5=13 seconds. Therefore, the system 300 may prepare transactions with a maximum 13-second delay in preparing the daily sales report 336 or in making the transactions that occur 13-second in advance for query to the user.

Similarly, the system 200 may determine or estimate a maximum of 5-second latency to prepare the hourly sales report 338 because the sum of the hourly report latency 346 and the sales latency is 5 (i.e., 3+2), or a 10-second latency for a daily sales report without corresponding demographics information from login events, or a 8-second latency for an hourly login report without corresponding sales data from sales events.

Figure 4:
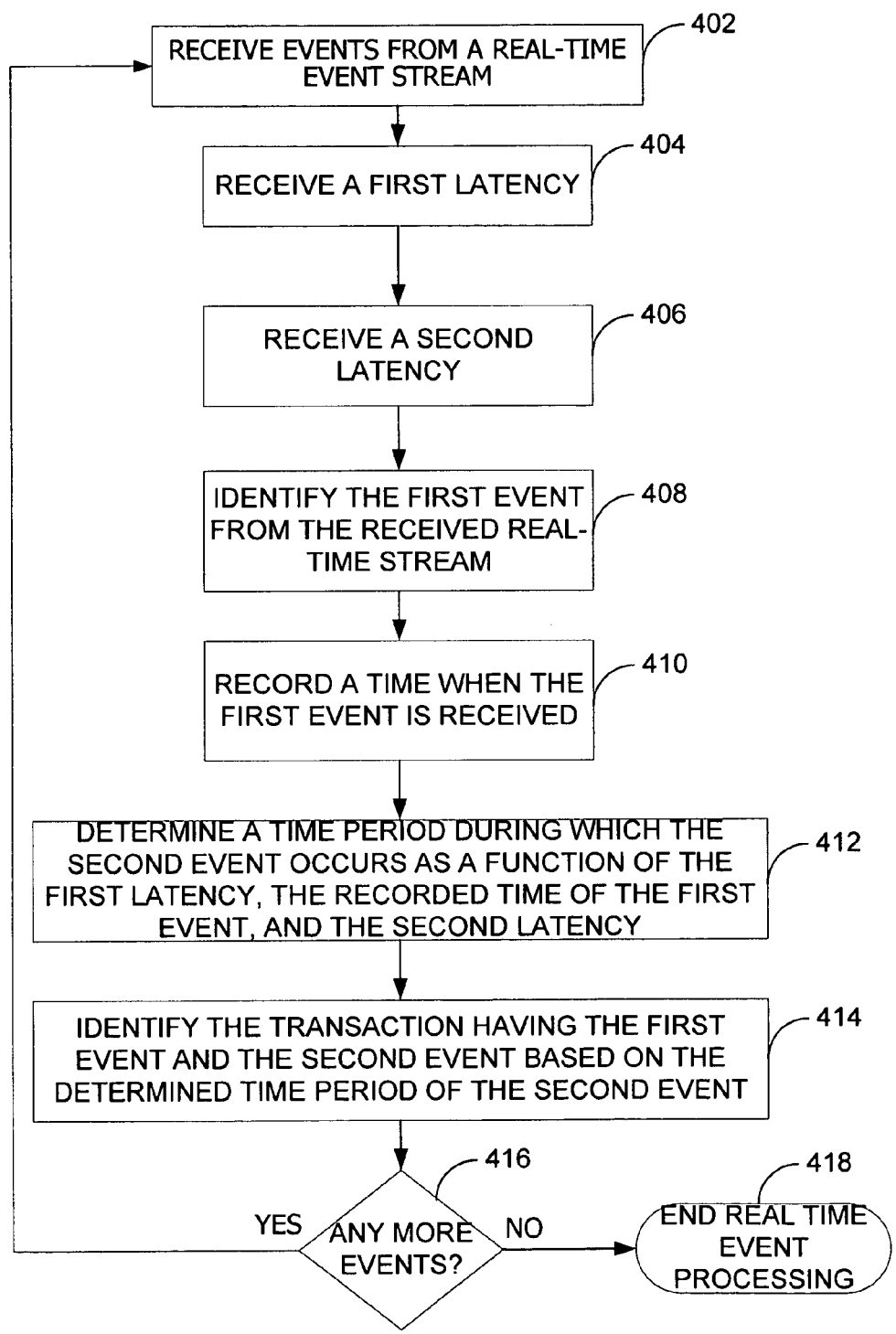
FIG. 4 is a flow chart illustrating an alternative embodiment of a method for identifying a transaction from an event stream received in real time according to one embodiment of the invention.

FIG. 4 is a flow chart illustrating a method for identifying a transaction from an event stream received in real time according to one embodiment of the invention. At 402, a plurality of real time events is received from an event stream, such as online sales transaction, ATM transactions, or the like. The plurality of events defines a plurality of transactions and each of the plurality of transactions includes a first event and a second event. At 404, a first latency relating to the first event is received or determined, and a second latency relating to the second event is received or determined at 406. At 408, the first event is identified from the event stream. Using the illustrated example in FIG. 3A, the processing agent component 206 identifies a login event from the event stream 322 including login events and purchase events. The processing agent component 206 also records a time when the first event is received at 410.

At 412, the event stream processing coordinator 210 determines a time period during which the second event occurs as a function of the first latency of the first event, the recorded time of the first event, and the second latency of the second event. As such, the event stream processing coordinator 210 identifies the transaction having the first event and the second event based on the determined time period of the second event at 414. The system 200 further determines whether there are more events to be processed or evaluated at 416. If the determination is positive, the system 200 proceeds to evaluate the next event available. If the determination is negative, the system 200 terminates the real time event processing at 418.

At least some of the examples noted above have been described with respect to two events. It is contemplated that alternative embodiments may involve more than two events so that, for example, there may be intermediate events in the transactions.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 4 to identify from a real time event stream a transaction including events having latency.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above embodiments described above without departing from the scope of the invention, it is intended that all matter contained in the above description and shown in the accompanying drawings shall be interpreted as illustrative and not in a limiting sense.

What is claimed is:

1. A computerized method for identifying from a real time event stream a transaction including events having latency, said computerized method comprising:

receiving events from the real time event stream, wherein the events define a plurality of transactions to be identified, wherein each of the plurality of transactions includes a first event and a second event, said first event having a first latency relative to the real time event stream and said second event having a second latency relative to the real time event stream, said first latency and said second latency being configured by a user, wherein the first latency and the second latency are guaranteed as a function of at least one of the following: a different batch size in receiving the events from the real time event stream, increasing a frequency of processing event quanta from the real time event stream, and decreasing the frequency of processing event quanta from the real time event stream;

identifying the first event from the received real time event stream;

recording a time when the first event is received;

determining a time period during which the second event will occur as a function of the first latency, the recorded time of the first event, and the second latency; and identifying the transaction having the first event and the second event based on the determined time period of the second event.

2. The computerized method of claim 1 further comprising converting a partially ordered event stream to a fully ordered event stream by buffering and sorting.

3. The computerized method of claim 1, further comprising increasing or decreasing the first latency or the second latency in response to an input from the user or wherein the first latency or the second latency is based on one or more of the following: a pre-determined latency, a latency provided by the real time stream of events, and a minimum latency as a function of the real time stream of events.

4. The computerized method of claim 1 wherein the second event is related to the first event according to the defined transaction.

5. The computerized method of claim 1 further comprising receiving a query from the user for retrieving received events relating to the identified transaction and continuously processing the query with respect to the real time event stream to provide a query result which is independent of latency.

6. The computerized method of claim 5 wherein the query includes query parameters based on the first event, the second event, and the transaction.

7. The computerized method of claim 1 wherein one or more computer-readable storage media have computer-executable instructions for performing the computerized method of claim 1.

8. A system for identifying from a real time stream of events a transaction including events having latency, said system comprising:

an interface for receiving a plurality of events from the real time stream of events which define a plurality of transactions to be identified, wherein each of the plurality of transaction includes a first event and a second event relating to the first event, said first event having a first latency relative to the real time stream of events and said second event having a second latency relative to the real time stream of events;

a processor associated with the interface for identifying the first event from the plurality of events received by the interface;

a memory for storing data relating to a time when the first event is received, said memory also storing data relating to the first latency and storing data relating to the second latency, said first latency and said second latency being configured by a user, wherein the first latency and the second latency are guaranteed as a function of at least one of the following: a different batch size in receiving the events from the real time event stream, increasing a frequency of processing event quanta from the real time event stream, and decreasing the frequency of processing event quanta from the real time event stream;

wherein said processor determines a time period during which the second event will occur in the stream of events is to be received by the interface as a function of the stored data relating to the first latency, the recorded time of the first event, and the second latency; and wherein said processor identifies the defined transaction having the first event and the second event based on the determined time period of the second event.

9. The system of claim 8 wherein the processor converts a partially ordered event stream to a fully ordered event stream by buffering and sorting.

10. The system of claim 8 wherein the processor further increases or decreases the recorded time of the first event in response to the transmitted data from the interface or wherein the processor increases or decreases the first latency and the second latency in response to the transmitted data from the interface and wherein the memory stores data relating to the adjusted first latency and adjusted second latency.

11. The system of claim 9 wherein the data stored in the memory relating the first latency or the second latency is based on one or more of the following: a pre-determined latency, a latency provided by the real time stream of events, and a minimum latency as a function of the real time stream of events.

12. The system of claim 8 wherein the processor further retrieves the received events relating to the identified transaction in response to a query from the user.

13. The system of claim 8 wherein the memory stores data relating to the first event and the second event of the identified transaction.

14. The system of claim 8 wherein the defined transaction includes a third event, and wherein the data relating to the first event and the second event is removed from the memory after the processor identifies the third event of the defined transaction.

15. One or more computer-readable storage media having one or more computer-executable components for identifying from a real time stream of events a transaction including events having latency, said computer-executable components comprising:

a processing agent component including a plurality of processing nodes for receiving an input real time stream of events relating to a transaction, said transaction including a first event and a second event, said first event having a first latency relative to the real time stream of events and said second event having a second latency relative to the real time stream of events, said first latency and said second latency being configured by a user, wherein the first latency and the second latency are guaranteed as a function of at least one of the following: a different batch size in receiving the events from the real time event stream, increasing a frequency of processing event quanta from the real time event stream, and decreasing the frequency of processing event quanta from the real time event stream;

an event stream processing coordinator associated with the processing agent component for identifying the first event from the received events from the input real time stream of events, said processing agent component records a watermark indicative of a time when the first event is received;

wherein said event stream processing coordinator determines a time period during which the second event will be found in the stream of events as a function of the first latency, the recorded watermark of the first event, and the second latency; and wherein the event stream processing coordinator identifies the transaction having the first event and the second event based on the determined time period of the second event.

16. The computer-readable storage media of claim 15 wherein the event stream processing coordinator further modifies the recorded watermark of the first event in response to the transmitted data from the processing agent component.

17. The computer-readable storage media of claim 15 wherein the event stream processing coordinator converts a partially ordered event stream to a fully ordered event stream by buffering and sorting.

18. The computer-readable storage media of claim 15 wherein the event stream processing coordinator increases or decreases the first latency and the second latency in response to the transmitted data from the processing agent component or wherein the first latency or the second latency is based on one or more of the following: a pre-determined latency, a latency provided by the real time stream of events, and a minimum latency as a function of the real time stream of events.

19. The computer-readable storage media of claim 15 wherein the defined transaction includes a third event and wherein the processing agent component outputs the first event and the second event to an output event stream in response to identifying the third event by the event processing component.

20. The computer-readable storage media of claim 15 further comprising an interface component for receiving a query from a user for retrieving the identified transaction, said query includes one or more query parameters based on the first event, the second event, and the transaction.

* * * * *